April 3, 1945.   J. J. RAUSCH   2,373,052
MOTION PICTURE PROJECTOR APPARATUS
Filed Oct. 20, 1943
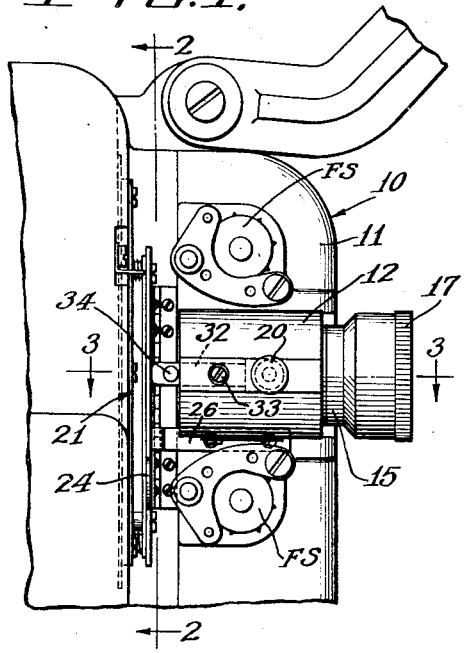
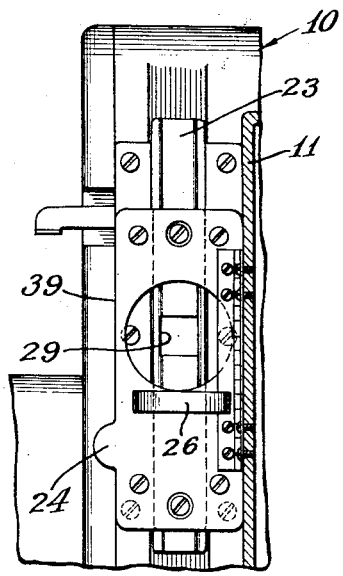
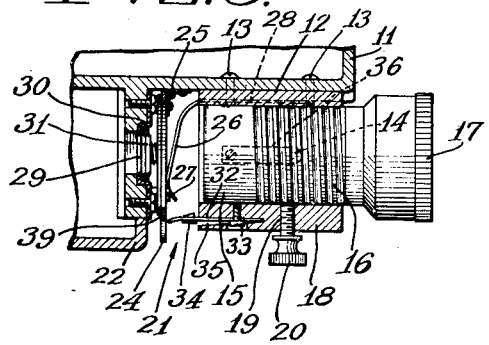
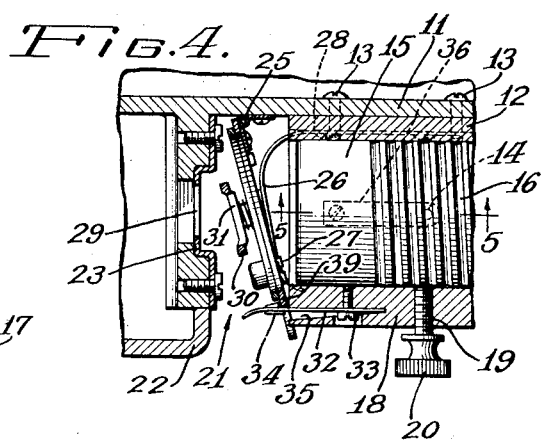
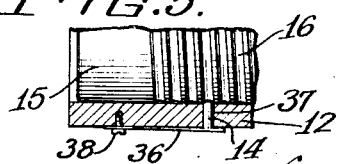
Inventor:
Joseph J. Rausch
By Wallace and Cannon.
Attorneys Patented Apr. 3, 1945

2,373,052

UNITED STATES PATENT OFFICE 2,373,052

MOTION PICTURE PROJECTOR APPARATUS

Joseph J. Rausch, Berwyn, Ill., assignor to Litho Equipment & Supply Co., Chicago, Ill., a copartnership consisting of Emelia E. Valette and Carmot E. Valette Application October 20, 1943, Serial No. 507,009

1 Claim. (Cl. 88—17)

This invention relates to motion picture projector apparatus and including both sound projectors and silent projectors, and, more particularly, to a film gate and focusing lens mount structure for such projectors.

Heretofore in the art it has been customary to slidably mount the focusing lens of motion picture projectors, including both sound projectors and silent projectors, upon the body or supporting frame thereof and to hingedly or otherwise mount the film trap door adjacent the rear end of the focusing lens. While such prior art arrangements have been, in general, satisfactory, they have had one objectionable feature, namely, that opening and closing of the film trap door thereof frequently caused the operator's fingers to disturb the adjustment of the focusing lens, thereby throwing the focusing lens out of proper adjustment or focus.

Accordingly, a primary object of the present invention is to provide in a motion picture projector, including both sound projectors and silent projectors, a novel arrangement and mounting of the film trap door and focusing lens to the end that the film trap door may be opened and closed without disturbing the adjustment or focus of the focusing lens.

Another object of the invention is to provide a novel device for latching the focusing lens of a motion picture projector in an adjusted position and against unintentional or accidental displacement therefrom.

Other and further objects of the present invention will be apparent from the following description and claim and will be understood by reference to the accompanying drawing which, by way of illustration, shows a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

In the drawing,

Fig. 1 is a fragmentary side elevational view of the film gate and focusing lens construction of a motion picture projector embodying the present invention;

Fig. 2 is a view on line 2—2 in Fig. 1, partly in section and partly in elevation;

Fig. 3 is a horizontal sectional view on line 3—3 in Fig. 1 showing the film trap door in closed position and showing the focusing lens latched in an adjusted position and against movement therefrom;

Fig. 4 is a sectional view, on an enlarged scale, of the parts shown in Fig. 3, but showing the film trap door latched in open position; and Fig. 5 is a sectional detail view on line 5—5 in Fig. 4.

A preferred embodiment of the present invention is shown in the drawing and is there illustrated as being embodied in a motion picture projector which is generally indicated at 10 and may be of any size and type, that is to say, either a silent projector or a sound projector and either of the 16 mm. or the 35 mm. or other film width type. The projector 10 comprises a supporting frame which includes a vertical center partition or supporting wall 11 on which a focusing lens mount or housing 12 is secured in any suitable manner, as by means of the fastening elements or bolts 13.

The focusing lens housing 12 has a smooth and substantially cylindrical internal surface and slidably mounted in the lens housing 12 is a substantially cylindrical focusing lens having an enlarged front end portion 17 in which the focusing lens (not shown) is arranged.

The focusing lens barrel 15 has a spirally grooved internal surface 16 and adapted to engage the spirally grooved internal surface 16 of the focusing lens barrel 12 is a latching detent or pin 14 which is slidably mounted in an opening 37 which is formed in the wall of the focusing lens housing 12. This latching detent or pin 14 is mounted on a flat leaf spring 36 one end portion of which is attached to the wall of the focusing lens housing 12 as at 38 (Fig. 5).

It will then be seen that the focusing lens and its mounting or supporting barrel 15—17 may be adjusted in the housing 12 therefor, by slidably manipulating the focusing lens barrel 15—17 in the housing 12 so as to secure an approximate focus and then slowly rotating the focusing lens barrel 15—17 to complete the focusing operation and to secure an accurate focus. During such slidable movement of the focusing lens and its mounting or supporting barrel 15—17 the spirally grooved external surface 16 of the focusing lens barrel or mounting 15—17 slides over or past the latching detent or pin 14, forcing the latter outwardly against the action of the spring 36 which normally urges the latching detent 14 into latching engagement with the spiral groove 16 in the external surface of the focusing lens mount or barrel 15—17. However, after an approximate adjustment of the focusing lens mounting or barrel 15—17, and the focusing lens carried thereby, has been thus effected an accurate and fine adjustment or focus may be effected by slowly rotating the focusing lens barrel or mounting 15—17 and the focusing lens carried thereby in its housing 12. Such final adjustment or focusing is made possible by reason of the engagement of the latching detent 14 in the spiral groove 16 of the focusing lens barrel 15—17 so that when the focusing lens barrel 15—17 is slowly rotated in the housing 12 the detent or pin 14 will track in the spiral groove 16 in the focusing lens barrel 15 and thereby cause the focusing lens barrel 15—17 and the focusing lens carried thereby to move axially of and in the housing 12 so as to effect the desired fine adjustment or focus of the focusing lens.

As shown in Figs. 3 and 4 of the drawing, the outer side wall of the focusing lens housing 12 has a tapped opening 19 therein and threaded into this tapped opening 19 is a latch element in the form of a thumb screw 20 and the inner end of the thumb screw 20 is adapted to bear upon and to have latching engagement with the spirally grooved external surface 16 of the focusing lens barrel 15—17.

Hence it will be seen that the focusing lens barrel 15—17 and the focusing lens carried thereby may be retained and latched in a preselected adjusted position or focus by manipulating the latch element or thumb screw 20 so that the inner end thereof bears upon the spirally grooved external or peripheral surface 16 of the focusing lens barrel 15—17. However, it will also be seen that adjustment of the focusing lens may be manually effected by releasing the latch element or thumb screw 20 and then sliding or rotating the focusing lens barrel 15—17 and the focusing lens carried thereby in the manner hereinbefore described.

The projector 10 embodying the present invention includes a film gate or trap 21 (Figs. 3 and 4) through which the film, either silent or sound film (not shown), may be threaded and advanced by suitable film advancing means including the film advancing sprockets FS.

As shown in Figs. 3 and 4, the film gate or trap 21 is defined, in part, by a vertically extending stationary rear wall 22 having a film guiding shoe 23 thereon and, in part, by means of a movable film trap door 24 which is hingedly mounted at one side or edge thereof, as at 25, upon the vertically extending center partition 11. A spring-pressed film guiding shoe 30 is attached to the film trap door 24 on the inner side thereof and cooperates with the stationary film guiding shoe 23 to guide the film through the film gate 21 when the film trap door 24 is closed.

A curved leaf spring 26 has one end portion attached, as at 27, to the film trap door 24, and the other end portion of the leaf spring 26 is attached, as at 28, to the wall of the focusing lens housing 12 (Figs. 3 and 4).

A light aperture 29 is provided in the vertically extending film track 23 and a light aperture 31 is provided in the spring-urged film guide or shoe 30 which is attached to the film trap door 24 on the rear side thereof (Figs. 3 and 4).

A resilient latch keeper in the form of a flat leaf spring 32 has one end portion thereof anchored, as at 33, upon the side wall 18 of the focusing lens housing 12, and this latch keeper has a detent portion 34 which is adapted for latching engagement with a marginal edge portion 39 of the film trap door 24 (Figs. 3 and 4).

It will be noted, in this connection that the body of the resilient latch spring or keeper 32 is so mounted that it has limited movement within a slot or guideway 35 which is provided in the wall 18 of the lens housing 12 so as to enable the detent or latching end portion 34 of the latch keeper or spring 32 to be moved into and out of latching engagement with the marginal edge portion 39 of the film trap door 24.

In the use and operation of the new motion picture projector apparatus the focusing lens barrel 15—17 and the focusing lens carried thereby may be adjusted or focused in the manner hereinbefore described, whereupon the focusing lens barrel 15—17 and the focusing lens carried thereby may be secured in the desired adjusted position and focus by screwing the inner end portion of the manually operable latch element or thumb screw 20 into engagement with the spirally grooved peripheral surface 16 of the focusing lens barrel 15—17.

The film trap door 24 is normally retained in closed position, so as to close the film gate 21, by action of the resetting spring 26 which urges the film trap door 24 into closed position. However, when it is desired to open the film gate 21, to thread the film therethrough or for any other reason, this may readily be accomplished by swinging the film trap door 24 upon its hinge or pivot 25 (counterclockwise from the point in which it is shown in Fig. 3 into the position in which it is shown in Fig. 4), against the action of the resetting spring 26. During this operation the marginal edge portion 39 of the film trap door 24 moves into latching engagement with the latching detent 34 on the latch element or spring 32, thereby latching the film trap door 24 in open position, as in Fig. 4.

When it is desired to close the film gate 21 and the film trap door 24, this may readily be accomplished by exerting a slight outward pull on the latch spring or element 32 (downwardly in the groove or slot 35, as seen in Fig 4) thereby moving the latching detent 34 on the latch element or spring 32 out of latching engagement with the marginal edge portion 39 of the film trap door 24, whereupon the then tensioned resetting spring 26 will urge the film trap door 24 back into closed position, as in Fig. 3.

It will be noted that in the use of the present invention the film trap door may be readily moved from its normally closed position, as in Fig. 3, into open position, as in Fig. 4, and so as to open the film gate 21, and, likewise, may be moved from open position into closed position without disturbing the adjustment and proper focus of the focusing lens barrel 15—17 and the focusing lens carried thereby. This is primarily due to the fact that no part of the film trap door 24 or of the latching means 32—34—35 therefore at any time engages or bears upon the focusing lens barrel 15—17 and the focusing lens barrel 15—17 and the focusing lens carried thereby are securely latched in adjusted position and in proper focus by the latching engagement of the inner portion of the latching screw 20 with the spirally grooved peripheral surface of the focusing lens barrel 15—17.

Hence it will be seen that a difficulty heretofore experienced in the use of prior motion picture projectors, in which movement of the film trap door has caused or has tended to cause movement of the focusing lens barrel and the focusing lens carried thereby out of focus, is overcome.

It will thus be seen from the foregoing description, considered in conjunction with the accompanying drawing, that the present invention has the desirable advantages and characteristics and accomplishes its intended objects, including those hereinbefore specifically pointed out, and others which are inherent in the invention.

I claim:

In a motion picture projector apparatus provided with a light opening and comprising a supporting frame for a focusing lens barrel housing containing a focusing lens barrel, means for securing the focusing lens barrel in an adjusted position in and relative to said focusing lens barrel housing; an apertured film trap door, adapted to be maintained either in an open or a closed position, hingedly mounted at one side edge thereof on the supporting frame and with the other side thereof being free, the said trap door being in alignment with the focusing lens barrel and the light opening in the projector apparatus, an elongated curved spring having one end thereof attached to the film trap door and its other end attached to the focusing lens housing for maintaining the trap door in closed position, a resilient latch keeper in the form of a flat spring having one end anchored in a guideway provided in the wall of the lens housing substantially diametrically opposite of the attachment of one end of the said curved spring to said housing and having its other end projecting beyond the inner end of the lens housing and provided thereat with a detent for engagement with the free marginal edge of the film trap door to maintain the latter in its open position.

JOSEPH J. RAUSCH.